Patented May 17, 1938

2,117,299

UNITED STATES PATENT OFFICE 2,117,299

CYCLOHEXENE DERIVATIVES

Walter G. Christiansen, Glen Ridge, N. J., assignor to E. R. Squibb & Sons, New York, N. Y., a corporation of New York No Drawing. Application September 15, 1934, Serial No. 744,198

6 Claims. (Cl. 260—33)

This invention relates to, and has for its object the provision of, compounds having the general formula

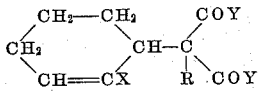

wherein X represents a halogen (especially bromine or chlorine), R represents an alkyl, an aryl (especially phenyl), or an aralkyl, the Y's represent each alkoxy or together

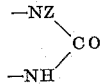

wherein Z represents hydrogen, an alkyl (especially methyl), or an alkali metal; compounds having the general formula

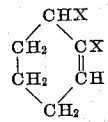

wherein X represents a halogen (especially bromine or chlorine); and methods for the preparation of these compounds.

EXAMPLES

1,2-dibromo Δ²-cyclohexene 100 g. 1,2,3-tribromo cyclohexane and 26.5 g. crushed potassium hydroxide are heated in a Claissen flask on a steam-bath while the system is evacuated; a vigorous reaction ensues, with distillation at 40 mm.; the distillate is dissolved in ether and the solution dried over sodium sulfate; and the solvent being removed and the residual oil rectified, there is obtained the compound sought, a colorless oil boiling at 110–111°/7 mm.

Ethyl 2-bromo Δ²-cyclohexenyl malonic ester 33.3 g. ethyl malonic ester is added to a solution, cooled to 30°, of 4.03 g. sodium in 75 cc. absolute alcohol, and while the temperature is maintained at 30–35° 42 g. 1,2-dibromo Δ² cyclohexene is slowly added with stirring; the solution is refluxed six hours, and is then neutral to litmus; the sodium bromide being filtered out, the alcohol being removed from the filtrate, and the residue being rectified, there is obtained the compound sought, a colorless oil boiling at 141.5–142.5°/1 mm.

To procure an aryl, an aralkyl, or some alkyl other than ethyl in the compound sought, the malonic ester of that aryl, aralkyl, or other alkyl (say phenyl, benzyl, or methyl, malonic ester, respectively) is employed instead of the ethyl malonic ester in the foregoing example.

5-ethyl 5-(2'-bromo Δ²'-cyclohexenyl) barbituric acid 22.0 g. ethyl 2-bromo Δ²'-cyclohexenyl malonic ester and 6.0 g. urea are successively added to a cold solution of 3.06 g. sodium in 56 cc. absolute alcohol; the mixture is refluxed six hours in an oil-bath at 120°; alcohol is removed by distilling in vacuo; the residue is diluted with 200 cc. cold water, and extracted with ether to recover unreacted ester; the aqueous alkaline solution is acidified with 50% acetic acid; and the precipitate, on being washed with water, dried in vacuo, and crystallized from benzene, yields the compound sought, a white crystalline substance melting at 225–226°, soluble in alcohol and acetone but scantily soluble in water, benzene, and ether.

To procure an alkyl instead of a N-hydrogen in the compound sought, the correspondingly substituted urea (say methyl urea) is employed instead of unsubstituted urea in the foregoing example.

Compounds of this type have shown promise of value as hypnotics.

Sodium salt of 5-ethyl 5-(2'-bromo Δ²'-cyclohexenyl) barbituric acid

A solution of 10 g. 5-ethyl 5-(2' bromo Δ²' cyclohexenyl) barbituric acid in 31.6 cc. 1.0036 N sodium hydroxide solution, on being evaporated to dryness in vacuo and further dried in vacuo over calcium chloride, yields the compound sought as a water-soluble white powder.

Among the many other compounds that may be prepared in accordance with the invention are:

5-isopropyl 5-(2'-bromo Δ²'-cyclohexenyl) barbituric acid

5 - normal-butyl 5-(2'-chloro Δ²-cyclohexenyl) barbituric acid 5-phenyl 5-(2'-chloro Δ²-cyclohexenyl) barbituric acid Sodium salt of 5-methyl 5-(2'-bromo Δ²'-cyclohexenyl) barbituric acid Sodium salt of 5-benzyl 5-(2'-chloro Δ²'-cyclohexenyl) barbituric acid 5-methyl 5-(2'-chloro Δ²'-cyclohexenyl) N-ethyl barbituric acid 5 - benzyl 5 - (2' - bromo Δ²'-cyclohexenyl) N-methyl barbituric acid It is to be understood that the foregoing examples are merely illustrative and by no means limitative of the invention, which may be variously otherwise embodied—as with respect to particular substituents, reactants, and processes—within the scope of the appended claims.

I claim:

1. Compounds having the general formula

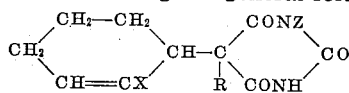

wherein X represents a halogen, R represents a member of the class consisting of alkyl, monocyclic aryl and monocyclic aralkyl, and Z represents a member of the class consisting of hydrogen, alkyl, and alkali metal.

2. Compounds having the general formula

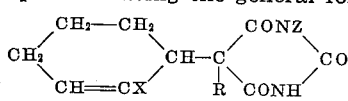

wherein X represents a halogen, R represents an alkyl, and Z represents a member of the class consisting of hydrogen, an alkyl, and an alkali metal.

3. Compounds having the general formula

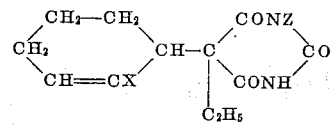

wherein X represents a halogen and Z represents a member of the class consisting of hydrogen, an alkyl, and an alkali metal.

4. 5-ethyl 5-(2'-bromo $\Delta^{2'}$-cyclohexenyl) barbituric acid.

5. Sodium salt of 5-ethyl 5-(2'-bromo $\Delta^{2'}$-cyclohexenyl) barbituric acid.

6. 5-methyl 5 - (2'-chloro $\Delta^{2'}$-cyclohexenyl) N-ethyl barbituric acid.

WALTER G. CHRISTIANSEN.